(12) United States Patent
Chandiramani et al.

(10) Patent No.: US 6,691,250 B1
(45) Date of Patent: Feb. 10, 2004

(54) FAULT HANDLING PROCESS FOR ENABLING RECOVERY, DIAGNOSIS, AND SELF-TESTING OF COMPUTER SYSTEMS

(75) Inventors: Anil K. Chandiramani, San Jose, CA (US); Guenter E. Roeck, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 09/607,108

(22) Filed: Jun. 29, 2000

(51) Int. Cl.[7] .............................................. G06F 11/00
(52) U.S. Cl. ........................... 714/25; 714/26; 714/47; 714/48; 714/15; 714/37
(58) Field of Search ........................... 714/25, 26, 47, 714/48, 15, 37

(56) References Cited

U.S. PATENT DOCUMENTS

| | | | | |
|---|---|---|---|---|
| 4,589,090 A | * | 5/1986 | Downing et al. ............... 714/10 |
| 4,833,679 A | * | 5/1989 | Anderson et al. ............. 714/758 |
| 4,972,453 A | | 11/1990 | Daniel, III et al. ............ 379/10 |
| 5,107,497 A | | 4/1992 | Lirov et al. .................. 371/15.1 |
| 5,195,095 A | | 3/1993 | Shah .......................... 371/15.1 |
| 5,291,494 A | | 3/1994 | Bruckert et al. ............. 371/11.3 |
| 5,301,312 A | | 4/1994 | Christopher, Jr. et al. .. 395/575 |
| 5,351,247 A | | 9/1994 | Dow et al. ................... 371/15.1 |
| 5,440,726 A | | 8/1995 | Fuchs et al. ................. 395/82.18 |
| 5,441,411 A | | 8/1995 | Hasse .......................... 434/34 |
| 5,528,752 A | | 6/1996 | Kise et al. .................. 395/183.05 |
| 5,544,308 A | | 8/1996 | Giordano et al. ........... 395/183.02 |
| 5,557,737 A | | 9/1996 | Wilhite et al. ............... 395/182.04 |
| 5,621,885 A | | 4/1997 | Del Vigna, Jr. ............. 395/182.11 |
| 5,712,972 A | | 1/1998 | Kakkar ....................... 395/183.02 |
| 5,715,389 A | | 2/1998 | Komori et al. ............... 395/184.01 |
| 5,727,143 A | | 3/1998 | Morinaga .................... 395/182.01 |
| 5,740,357 A | | 4/1998 | Gardiner et al. ............ 395/185.1 |
| 5,748,882 A | | 5/1998 | Huang ....................... 395/184.01 |
| 5,761,477 A | | 6/1998 | Wahbe et al. ............... 395/406 A |
| 5,812,759 A | | 9/1998 | Brooks ....................... 395/185.1 |
| 5,819,024 A | | 10/1998 | Kasuga et al. .............. 395/183.02 |
| 5,852,650 A | | 12/1998 | Hyyrynen et al. ............ 379/29 |
| 5,948,108 A | | 9/1999 | Lu et al. ...................... 714/4 |
| 5,948,112 A | | 9/1999 | Shimada et al. ............. 714/16 |
| 5,968,185 A | | 10/1999 | Bressoud et al. ............ 714/10 |
| 5,974,114 A | | 10/1999 | Blum et al. .................. 379/9 |
| 5,983,359 A | * | 11/1999 | Nota et al. ................... 714/10 |
| 5,983,364 A | | 11/1999 | Bortcosh et al. ............ 714/25 |
| 6,230,284 B1 | * | 5/2001 | Lillevold .................... 714/13 |
| 6,240,531 B1 | * | 5/2001 | Spilo et al. ................. 714/38 |
| 6,334,193 B1 | * | 12/2001 | Buzsaki ..................... 714/2 |
| 6,338,152 B1 | * | 1/2002 | Fera et al. .................. 714/48 |

FOREIGN PATENT DOCUMENTS

JP  02266457 A  * 10/1990  ........... G06F/15/16

* cited by examiner

*Primary Examiner*—Robert Beausoliel
*Assistant Examiner*—Emerson Puente
(74) *Attorney, Agent, or Firm*—Beyer Weaver & Thomas, LLP

(57) ABSTRACT

Methods, apparatus, and computer program products are disclosed for analyzing and recovering from severe to catastrophic faults in a computer system. When a fault that cannot be handled by the computer system's normal fault handling processes, a shadow mode created by a fault handling virtual machine is invoked. The fault handling virtual machine executes only when the normally nonrecoverable fault is encountered and executes as a triangulated or shadow mode on the system. Once shadow mode is invoked, fault context data is collected on the system and used to analyze and recover from the fault. More specifically, one or more post-fault stable states are constructed by the fault handling virtual machine. These stable states are used to bring the computer system back to a normal operating state in which the component or action causing the initial non-recoverable fault is avoided. Persistent faults may be encountered while the virtual machine is attempting to recover from the initial fault.

31 Claims, 10 Drawing Sheets

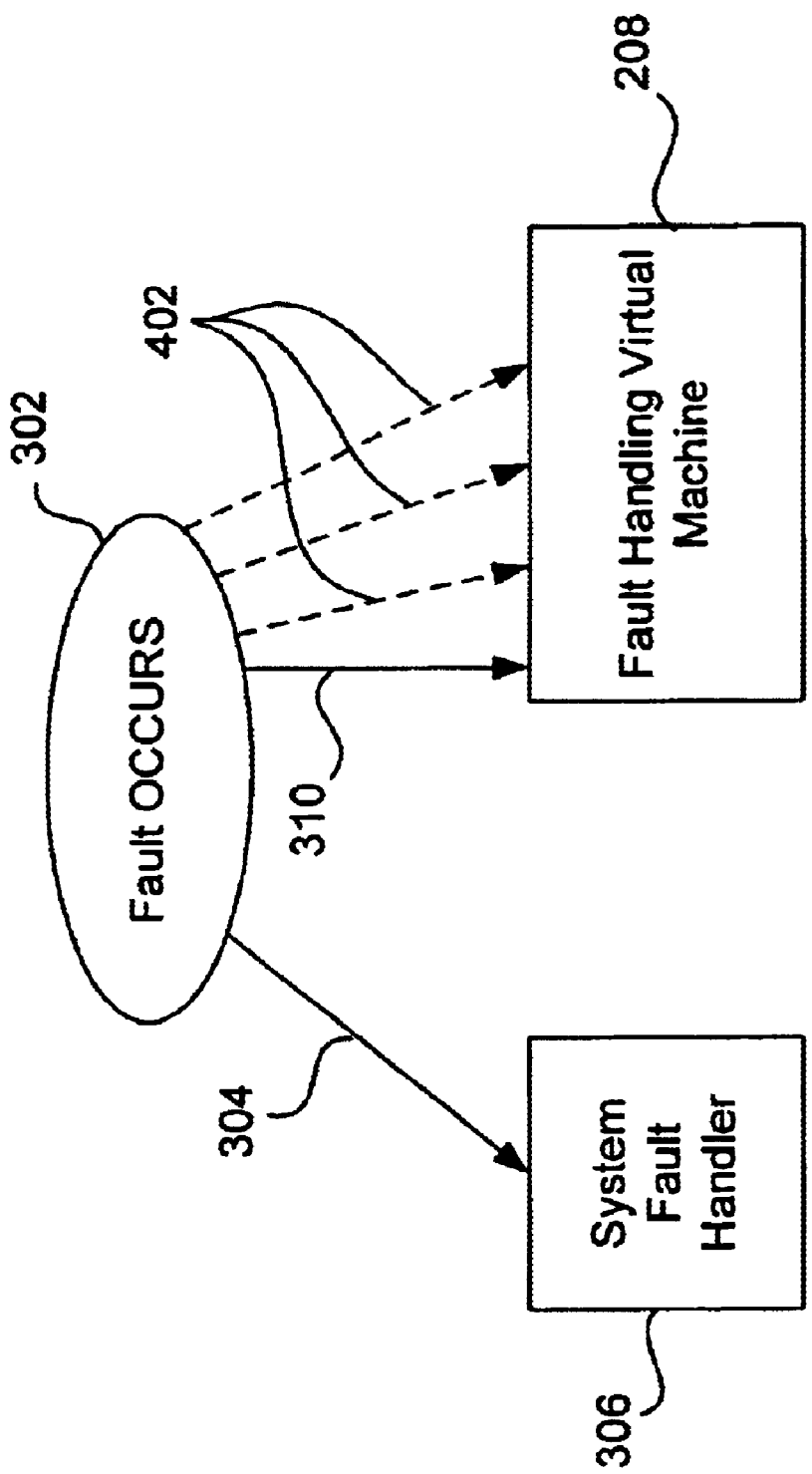

FAULT HANDLING PROCESS FOR ENABLING RECOVERY, DIAGNOSIS, AND SELF-TESTING OF COMPUTER SYSTEMS

BACKGROUND OF THE INVENTION

1. Field of the Invention

The present invention relates generally to computer system software for handling faults, resulting from logic and coding errors, corrupted states in memory, and other hardware failures, that can cause a computer system to crash. More specifically, the invention relates to a virtual machine used for the diagnosis of and recovery from such faults.

2. Discussion of Related Art

Since the time computers were being used in commercial and non-commercial settings on any scale, devising fault-tolerant computer systems has been an important and constantly evolving area in computer science. As computers are used more and more in environments where failures must be avoided as much as possible, fault-tolerant systems have been further developed to best handle unexpected system failures. With current fault tolerant systems, fault diagnosis and fault recovery have generally been separated or isolated from each other. Determining that a fault occurred because of a logic error or a corrupted memory state is a distinct task from actually recovering the system to a normal state so processing can continue. At one end of the spectrum of fault tolerant systems, recovery and restart are emphasized. At the other end of the spectrum, system testing and diagnosis emphasize system modeling, simulation, and analytical methods to obtain reliability estimates, such as proof of correctness and Mean Time To Failure metrics.

Between these two extremes, many software systems react to faults by taking a snapshot of all available state information at the time of the fault. In these systems, fault diagnosis is done after crash recovery by applying human intelligence to the state snapshot. Future recovery from occurrences of the same problem depends on the human analyst providing a fix for the problem which may require a new release of the software.

A common approach to fault tolerance is a checkpoint/restart mechanism with or without redundant hardware. The redundant hardware is used as a standby when the normal system fails. Test/diagnostic equipment depends on simulation and verification of some abstract model of the system. These methods are not always a practical solution for legacy systems, which are cost-sensitive and change due to market forces. These methods add cost and complexity to the system, making the system harder to debug and maintain. Furthermore, the redundant hardware adds to the overall costs of the system.

Systems not designed for fault tolerance have tools for fault diagnosis. One such technique involves taking a snapshot of the system where the snapshot is more complete and is taken at the precise time the fault or crash occurred or is detected. This type of complete snapshot typically provides a wealth of raw system state data that can be used for pure diagnosis and is in a human readable or accessible form, normally with a debugger or crash analyzer. Human intelligence is needed to get from symptoms to root causes and, as such, is labor-intensive and is done off-line, i.e., after unrecoverable damage has been done and the system has crashed. Although the snapshot is more complete, diagnostic information is still limited to the static snapshot of the system. A dynamic response to the fault cannot be determined since the dynamic response is gratuitously altered to capture the static snapshot and to then crash and reboot the system.

When a fault occurs in a system, system state information is unreliable. This makes implementing a sophisticated fault handler problematic since it must work under conditions where correctness of operation is suspect. Fault handlers are software systems and, thus, prone to the same types of failures they are designed to handle. The problem is exacerbated by difficulty in testing the fault handler for the various scenarios it must handle. If the scenarios were known, the fault could have been avoided. Methods to handle faults must consider not only the specifics of the fault but also the context in which the fault occurs. For example, the effect of a fault in an application level process context will differ from the effect of a similar fault in an interrupt handler. It is difficult to test for all possible scenarios. Thus, there is the risk of inadequately tested software attempting to diagnose and recover from an unknown and unexpected state and at a time when system operation is unreliable, making diagnostic/recovery more difficult than would be otherwise. Consequently, it is common to keep the fault handler as simple as possible.

Another method of diagnosing a fault involves using analytical methods, an expert system, or some type of modeling and simulation. These techniques may generate test vectors which are applied to the target system to study its response or to generate measures of reliability or stability. For numerous reasons, such methods are impracticable in applications where there is a rapidly evolving code base, typically in response to market forces. Such methods, used typically in academic settings, require a very stable software code base since much time and effort must go into formulating a model, setting up a test rig, and for data collection and analysis. These methods are off-line and are performed with reference to a model of the system and, thus, limited to that model, which rapidly becomes obsolete.

FIG. 1 is a flow diagram of a generic or abstract process of handling system faults used in the techniques described above and known in the field of fault handling software systems. A system fault handler (typically a component or module in a normal operating computer system), executing concurrently with other processes during normal operation of the computer system, begins with determining whether a fault that has occurred is a fault from which the system can recover at step 102. Recoverable faults are those that the system fault handler has been explicitly designed to handle. If the fault is recoverable, the system fault hander addresses the fault and returns the system to normal operation at step 106.

The emphasis here is on recovery and restart rather than diagnosis and analysis. In a checkpoint/restart system, the fault handler will use a checkpoint snapshot to return the system to a previous state, with the primary goal of simply getting the system back up and running, the goal with the highest priority in most commercial scenarios. If the fault is not recoverable, control goes to step 104 in which a current snapshot of the system is used. This static snapshot is of the system at the time the fault occurred (i.e., snapshot of current system state) and is used to diagnose the problem off-line. The system is brought back up again by having to take the significant step of rebooting, typically the least desirable way of resuming normal operations.

Therefore, it would be desirable to have a fault tolerant system that is capable of performing system recovery and restart and real-time diagnosis of the fault so that the same fault does not occur repeatedly. It would be desirable if the system fault handler consumed a minimal amount of resources by executing only when a fault occurs and not at all times. This also has the benefit of keeping the hardware and software less complex. In such a system, the degree of human analysis and effort spent on a current system state snapshot would be minimized since much of the diagnosis would be performed by the fault handler. It would also be desirable to be able to self-test and monitor the fault handler for various scenarios so that it can more efficiently restart the system and diagnose the fault and its context. It would be desirable for a fault handler process to permit the system to continue operation after an otherwise catastrophic failure in order to get more data on the dynamic effects of the fault or to recover from the fault.

SUMMARY OF THE INVENTION

To achieve the foregoing, methods, apparatus, and computer-readable media are disclosed for analyzing and recovering from severe faults in a computer system. In one aspect of the invention, a method of detecting and fixing a normally unrecoverable fault in a computer system is described. An initial fault caused from the computer system operating in a particular and typically expected sequence is recognized in the computer system. This fault is one that could not be handled by the computer system's normal fault handling processes. Once the fault is recognized as an unrecoverable fault, an alternative mode, or shadow mode, of operation for the computer system is invoked. This mode is used to run a fault handling virtual machine. The alternative mode is used to track and analyze behavior and performance of the computer system once the fault has occurred. Through this process, system state data can be gathered for fault diagnosis and system recovery. The alternative mode then attempts to recover from the fault by dynamically using the system state data to cause the computer system to operate in a different sequence thereby potentially avoiding the fault.

In another aspect of the present invention, a fault handling virtual machine is installed on a computer system upon detection of an unrecoverable fault. The fault handling virtual machine extends the capabilities of the computer system to fault diagnosis and recovery by applying expert knowledge of the computer system. One of the components is a post-fault stable state constructor that constructs a normal operating state for the computer system after a fault occurs. A fault data collector collects specific information on the state of the computer system at the time of the fault. The fault handling virtual machine also includes a fault data examination component for examining the specific information on the state of the computer system after a fault occurs.

In one embodiment, the fault handling virtual machine includes a persistent fault handler that is capable of processing and handling persistent faults that occur in the system once the fault handling virtual machine is invoked. In another embodiment, the fault handling virtual machine includes a fault severity measuring component for determining the severity of a fault by looking at expert knowledge of the computer system and a current fault state.

In yet another aspect of the present invention, a computer-readable media contains computer programming instructions for detecting and fixing a normally unrecoverable fault in a computer system. The programming instructions include computer code for recognizing that an initial fault has occurred by the computer system operating in a particular sequence. The programming instructions also include computer code for invoking an alternative mode of operation for the computer system upon recognizing the initial fault. The programming instructions also cause the use of the alternative mode to track performance of the system after the initial fault thereby gathering additional state information for fault diagnosis and system recovery. The computer programming instructions also prevent a subsequent fault from reoccurring as a result of recovery from the initial fault. This is done by using a dynamic state of the computer system to cause it to operate in another sequence such that the initial fault and the subsequent fault are potentially avoided.

BRIEF DESCRIPTION OF THE DRAWINGS

The invention will be better understood by reference to the following description taken in conjunction with the accompanying drawings in which:

FIG. 4 is an illustration showing a concept of initial and persistent faults.

DETAILED DESCRIPTION

Figure 1:
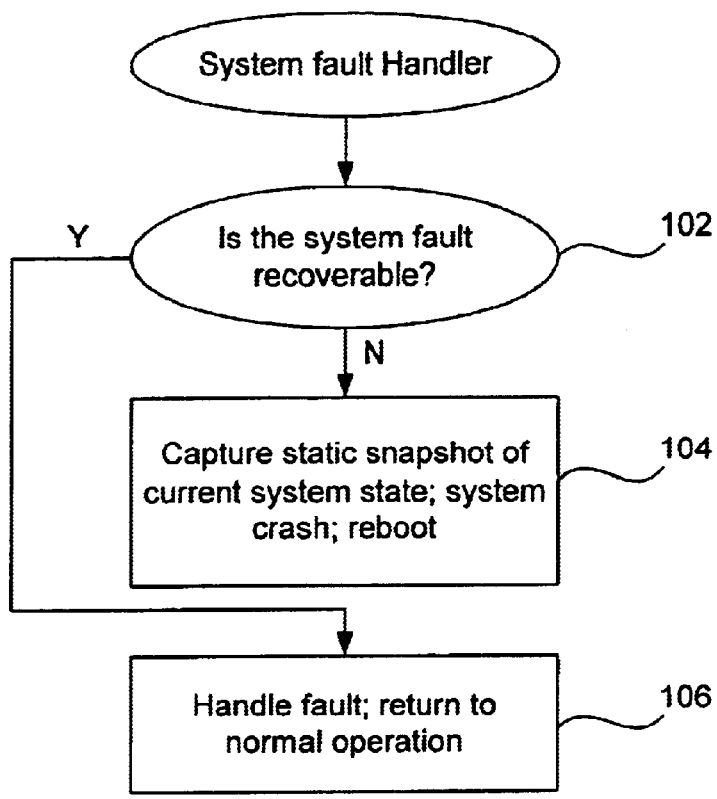
FIG. 1 is a flow diagram of a generic process of handling system faults known in the field of fault handling software systems.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The present invention seeks to overcome the limitations described above by triangulating a software system with a shadow mode of operation when a fault occurs. The shadow mode can track the subsequent dynamic behavior of the system for fault diagnosis, recovery, and fault-tolerance. The invention is a fault handling virtual machine, described below, that targets self-contained or autonomous systems. Improving the resilience of such systems to faults transparently improves the resilience of a larger system of which the autonomous system is a part.

The invention uses the target system itself for all data gathering, analysis, and testing, which occur non-intrusively with the normal operation of the system. Expert knowledge of the system is used to collect, in real time, data most relevant to the detected failure, thereby minimizing the need for a human analyst to do so. The shadow mode permits the system to continue operation after an otherwise catastrophic failure in order to get more data on the dynamic effects of the fault or to recover from the fault, or both. Generally, the fault handling process of the present invention creates an environment for an autonomous system to provide more intelligent, specialized, and adaptive responses to faults. These fault handling processes provide valuable insights into the dynamics of the target computer system under fault conditions. The fault handling process is co-resident with the target system and does not run or execute any code, require any synchronization or interaction with the target system in anyway until a fault occurs in normal operation.

The invention implements a transparent extension to a target system; that is, not requiring any changes to the target, nor any interaction or state synchronization with the target until a fault occurs. This allows keeping the shadow mode from adding any processing cost or complexity to the target. As a transparent extension, it has no impact on the normal functioning of the system.

In its simplest form the present invention is also an educational and training tool that reveals dynamic features of the system that are otherwise not known or seen. The shadow mode also provides a way for developing and testing fault diagnostic/recovery algorithms. Faults that occur in the field can be simulated in a laboratory environment to help develop and test a customized work-around or fix. The shadow mode allows for the implementation of training modes for a monitor process running in shadow mode. A free-running training mode tends to expose the weakest elements of the system first, i.e., those most likely to cause failures. This self-testing feature which allows for the construction of what-if scenarios to test the operation of a monitor process (described below) is superimposed upon the shadow mode. This test mode is useful in developing and testing a monitor process. It is the mode of operation in which a monitor process running in shadow mode is trained to deal with particular fault scenarios.

Software systems commonly use two levels of privilege in normal operation, typically a user or application level and a supervisor or kernel level of privilege. These are normal modes of operation. The shadow mode described is a third, triangulated mode used for fault diagnosis, recovery, and testing. In this mode, normal operation, via one of the normal modes, is slaved to a fault monitor process. User and kernel levels continue to be entered as would normally occur, but under supervision of the fault monitor process. The shadow mode can be described as a virtual machine. The mode runs a monitor process with the goal of returning the system to normal operation, in which the system is not slaved to the virtual machine.

The present invention describes an implementation of the shadow mode created by a fault handling virtual machine. The implementation includes some basic elements that are used by and shared with a monitor process that runs in the shadow mode. An instance of such a monitor process for handling a class of memory faults, for example, is one of the preferred embodiments.

Diagnosis and recovery are equally emphasized complementarily, concurrently, and in real-time. Both these aspects of fault handling interact with each other to generate post-fault stable states from which the system can resume, avoiding or eliminating the original fault.

The present invention describes the use of post-fault stable states. These are operational states in which the system can run normally as if no fault had occurred. As described above, a checkpoint/restart system is a discrete checkpoint or snapshot that is periodically taken. A checkpoint is a static representation of an operational state in which the system can run normally as if no fault had occurred. By contrast, post-fault stable states are dynamically derived using the fault state and expert knowledge of the particular target system, which will vary from system to system. Thus, the post-fault stable state can be expected to adapt to particular fault conditions much better than the static snapshot (checkpoint) which does not take the current dynamic state of the system into account. In the related art the use of expert knowledge also tends to be static in the form of rules or decision trees or fault trees, and is based on a model of the target system. The expert knowledge as used in the present invention is exclusively in the form of algorithms developed by observation of the dynamic behavior of the system in the presence of faults.

The fault handling virtual machine runs in a shadow mode. For the purpose of illustration, shadow mode operation departs from the conventional hierarchical model based on privilege levels that is common in software systems. This hierarchical model is a two-dimensional layered approach. For example, it goes from a user or application level to a supervisor or kernel level, to the hardware level, with a virtual machine layer in between the hardware and the kernel level. The shadow mode does not fit into this hierarchy. It is a parallel hierarchy and as such adds a third dimension to triangulate the software system.

In such a system, the fault handling virtual machine must be robust. This is because when a fault occurs it is this virtual machine that takes over operation of the system and is required to operate reliably even in the presence of faults. The term virtual machine is used here to mean an entity capable of emulating the operation of the real machine hosting the system and concurrently capable of extending the primitive capabilities of the real machine with superset capabilities. In the described embodiment, the superset capabilities are for fault diagnosis and recovery.

Accordingly, there is a training mode superimposed upon the shadow mode of operation for the purposes of test, verification, and development of the fault handling virtual machine itself. Thus, the invention implements a self-testing system that undergoes continual evolution as it encounters new and novel fault conditions. The present invention is the combination of several features for fault handling: post-fault stable states, a fault handling virtual machine which transitions a faulted system to a stable operating state, and which also enables the discovery of more complex algorithms and expert knowledge for generating such post-fault stable states, and self-testing.

As expected, specific diagnostic and recovery actions depend on the operating environment and the applications running on the host system. However, some diagnostic/recovery actions are common to the implementation of any fault handling virtual machine.

Figure 2:
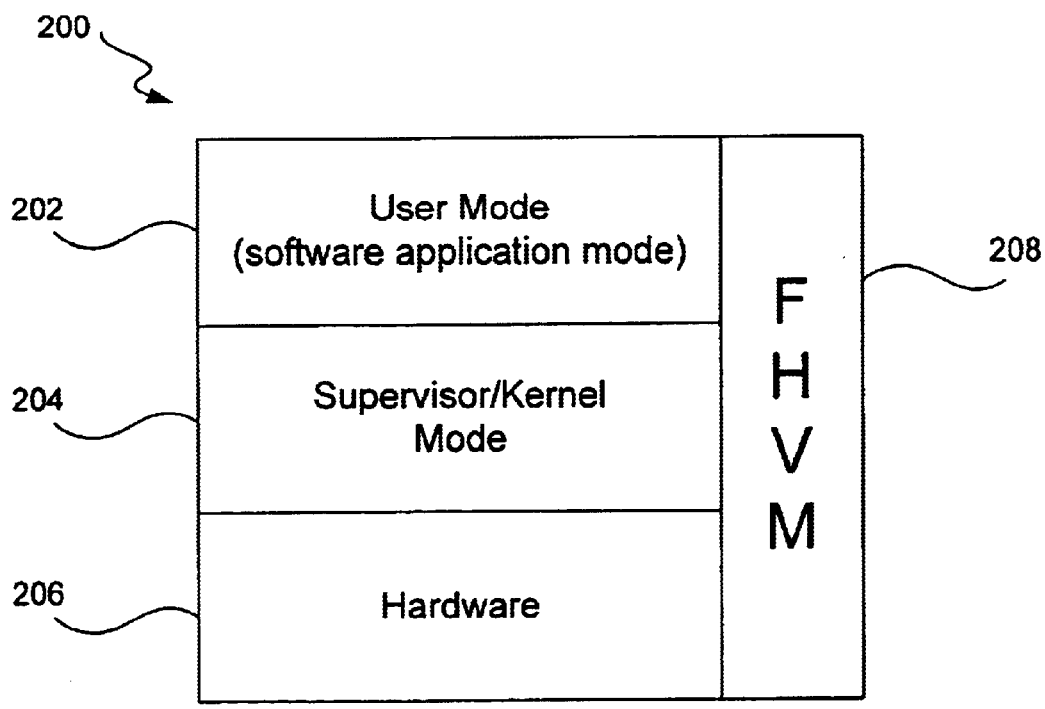
FIG. 2 is a block diagram showing an implementation of a shadow mode through a fault handling virtual machine in accordance with one embodiment of the present invention.

As mentioned above, faults are handled by a fault handler installed on the target system, as is commonly done in the class of systems to which this invention applies. The fault handler is permanently installed in the normal mode of operation in the system. As will be described below, this is true even upon implementation of the shadow mode of the present invention; the target system's existing fault handler itself remains unaffected. FIG. 2 is a block diagram showing the implementation of a shadow mode through a fault handler virtual machine (FHVM) in accordance with one embodiment of the present invention. It illustrates that the fault handler of the present invention runs in a third or triangulated mode of operation, not interfering with the operation of the other modes.

A typical hierarchy 200 of operational modes is made up of numerous layers. At the top is a user or software application mode 202 which is typically the least privileged mode of operation. Below this is a supervisory kernel mode of operation 204 (in some systems supervisory and kernel modes can be separate modes) which has a higher level of privileges. Both modes 202 and 204 operate on top of the physical hardware 206 of the target system. A third or triangulated mode of operation is a fault handler virtual machine 208 which implements a shadow mode of operation for handling faults that the system's normal fault handler processes cannot handle. FHVM 208 is not a normal mode and, thus, not depicted in the vertical hierarchy of modes. It operates transparently—off to the side—in relation to all the normal modes of operation, and, therefore, is shown along the side of the hierarchy of normal modes of operation. This triangulated mode of operation should be viewed broader than simply a third mode of operation. It is a shadow mode superimposed on top of and transparent to the target system. Thus, if a target system had four or five modes of operation, the shadow mode would be superimposed on all four or five modes. Although this is a simplified depiction of the modes of operation of a target computer system on which the present invention can operate, it serves to show the relationship of the shadow mode to the other modes in the system.

Figure 3A:
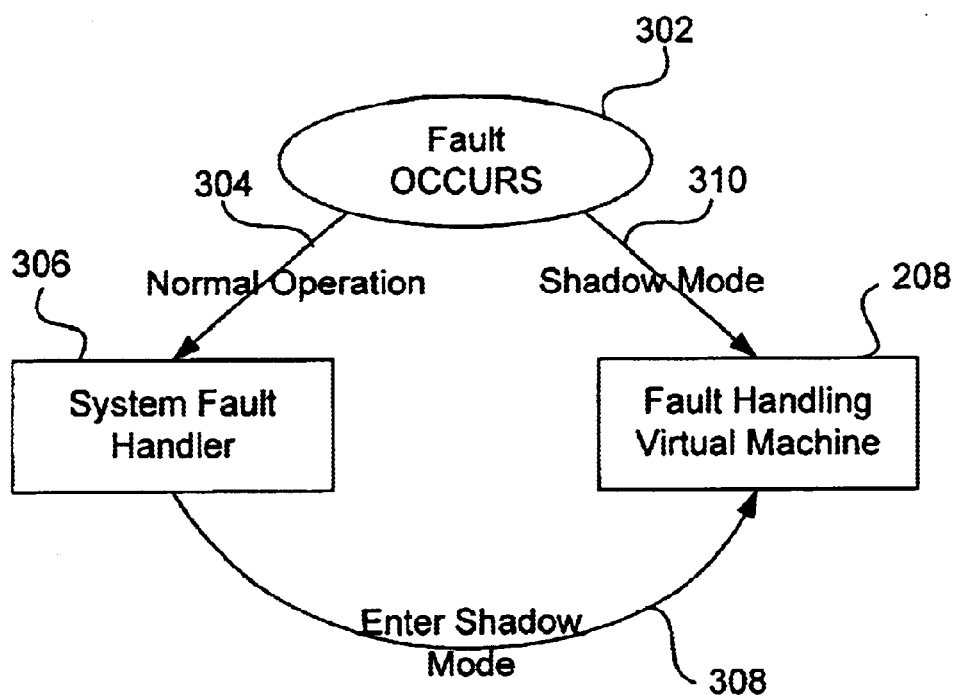
FIGS. 3A and 3B are high-level flow diagrams showing how the fault handling virtual machine is triggered in a target system in accordance with one embodiment of the present invention.
Figure 3B:
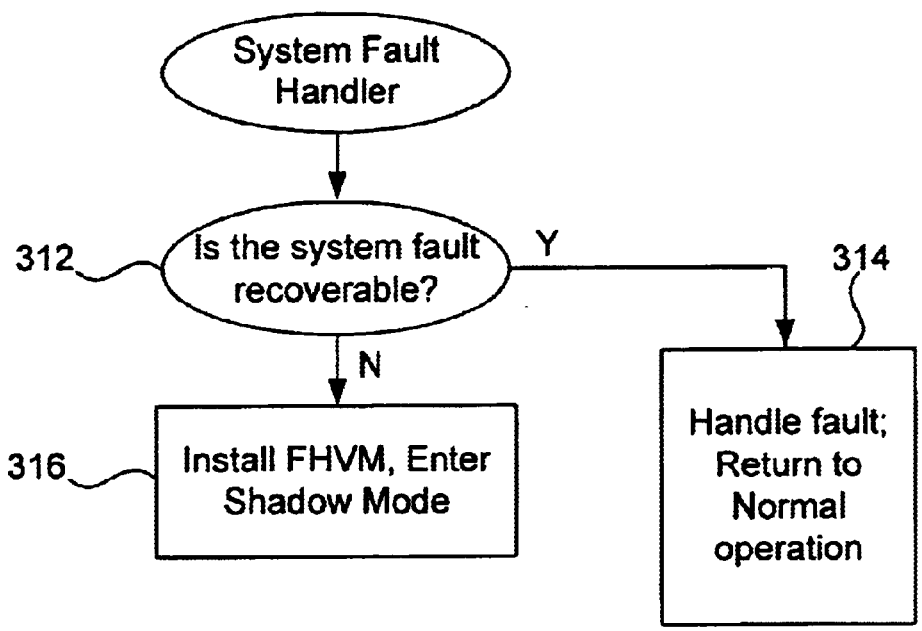

FIGS. 3A and 3B are high-level flow diagrams showing how the FHVM is triggered in a target system in accordance with one embodiment of the present invention. Shadow mode is initiated when the target system cannot handle a particular fault. In FIG. 3A, a fault in the target system is shown to occur at 302 due to one or more causes, such as memory corruption or problematic interrupt handlers, to name just two examples. In normal operation, shown by line 304, the fault is processed by a system fault handler 306. Once it is determined that system fault handler 306 is unable to handle the fault, the target system enters shadow mode, shown by line 308. FHVM 208 executes to implement the shadow mode. Fault occurrence 302 is then handled by FHVM 208 as shown by line 310.

The basic sequence or flow of events reflecting this is shown in FIG. 3B. Within system fault handler 306, at step 312, it is determined whether fault occurrence 302 is a system recoverable fault. If it is, control stays within the target's system fault handler, which rectifies the fault the best it can and returns the target system to normal operation at step 314. If not recoverable, control leaves the system fault handler and fault handling virtual machine 208 is installed at step 316 in that it begins execution. This is in contrast to system fault handler 306 which is permanently installed. Once FHVM 208 is installed, the target system enters the shadow mode at step 316. Shadow mode is entered transparently via standard linkages such as user-defined trap and signal handlers and trap vector addresses as defined by the underlying architecture of the target system.

In the described embodiment, the target system does not know that shadow mode is being initiated. It is done via common mechanisms already present in the class of systems to which this invention applies.

FIG. 4 is an illustration showing a concept of initial and persistent faults. Faults handled in shadow mode are normally catastrophic to the target system; that is, the normal course of the system would be to crash. Because the faults handled by virtual machine 208 are severe, fault recovery actions taken in shadow mode are not guaranteed to recover normal operation. Persistent faults occur after an initial fault, and require one or more additional recovery actions after the initial recovery action to return the system to normal operation. Some of the items in FIG. 4 are the same as or similar to those shown in FIGS. 3A and 3B. Data on a fault occurrence 302 are passed via line 304 to a system fault handler 306. Once an initial fault is detected, the target system invokes shadow mode via solid line 310. The fault recovery actions in shadow mode constitute fault handling virtual machine 208, first described in FIG. 2 above.

FHVM 208 can be described further as software that emulates the capabilities of the real target machine on which it operates, and extends the capabilities of the real machine. For the purposes of the present invention, the extended capabilities are for fault diagnosis and recovery. However, FHVM 208 also emulates the operation of the target system as a whole; that is, it includes the hardware and software that make up the normal operating mode of the target system. It also extends the target system by applying expert knowledge about the system in its fault diagnosis and recovery. This is used to derive, as a result, a post-fault stable state. A post-fault stable state is a restartable system context that is capable of effecting a recovery from the fault.

Persistent faults are represented by dashed lines 402. These are faults that may occur as a result of the virtual machine attempting to fix the problem that caused the initial fault. Although FHVM 208 may be highly efficient at solving a particular fault, it may not handle it perfectly and, therefore, may cause one or more persistent faults 402. Generally, these persistent faults occur because the FHVM is diagnosing the problem and attempting to fix it. During this diagnosis, faults are likely to occur in the target system. Previously, these persistent faults would not be an issue because the target system itself would not be functioning at all; the system would have crashed if the FHVM had not been invoked.

Figure 5:
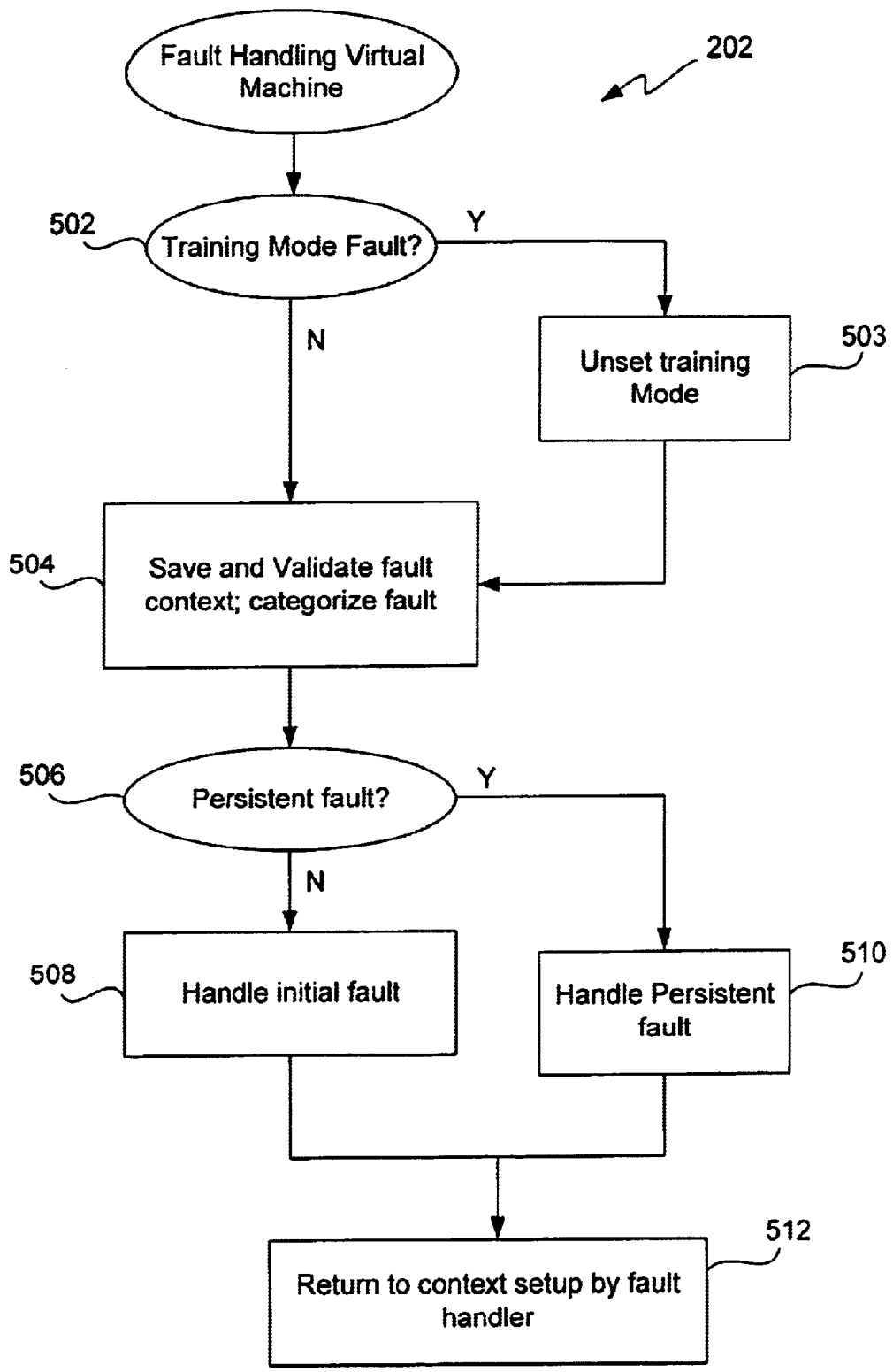
FIG. 5 is a flow diagram of a process of the fault handling virtual machine in accordance with one embodiment of the present invention.

FIG. 5 is a flow diagram of a process of the fault handling virtual machine in accordance with one embodiment of the present invention. It illustrates in greater detail FHVM 208. At step 502, the virtual machine determines whether the fault encountered is a training mode fault. In the described embodiment, FHVM 208 has a training mode or capability that is used to make the virtual machine more robust and error-free. It can be seen as a way of FHVM 208 performing a self-test. This mode is described in greater detail in FIG. 10. Whether a particular fault is the result of training mode can be determined by examining a flag indicating whether the fault is from selftesting. testing. If FHVM 208 determines that it is in training mode, control goes to step 503 where the training mode is unset to suppress training mode until the current fault is handled. This can be done by setting a flag. The training mode fault is then made to appear as if a real fault had occurred.

Both training mode faults and real faults are handled at step 504 where a fault context is saved and validated. The fault context can be obtained from a snapshot of the system when it encountered the fault; essentially a picture of what was happening in the system when the fault occurred. As is done in fault-tolerant systems presently, the snapshot allows for at least a preliminary analysis of the cause of the fault, so a short message can be displayed to the user (e.g., memory fault or interrupt handler fault, etc.). Such a snapshot typically provides a limited amount of information about the context. The FHVM 202 of the present invention uses this snapshot, subsequently deriving more state information from it, and modifying it to achieve its purpose.

At step 506 FHVM 202 determines whether the fault is a persistent fault. This can be done in a number of ways, one of which is simply checking a flag. As described above, a persistent fault is one that is caused by the virtual machine while attempting to fix a problem that caused an initial fault. As will be described below, the virtual machine handles persistent faults somewhat differently from initial faults. If it is a persistent fault, the persistent fault is handled at step 510. This process is described in greater detail in FIG. 7. If the fault is an initial fault, control goes to step 508 where the virtual machine treats it as an initial fault. This process is described in greater detail in FIG. 6. After steps 508 and 510, the target system continues operation at step 512. At this stage FHVM 202 has handled the problem and believes that the target system should continue operating. The target system can be said to be in a close-to-normal operating state.

Figure 6:
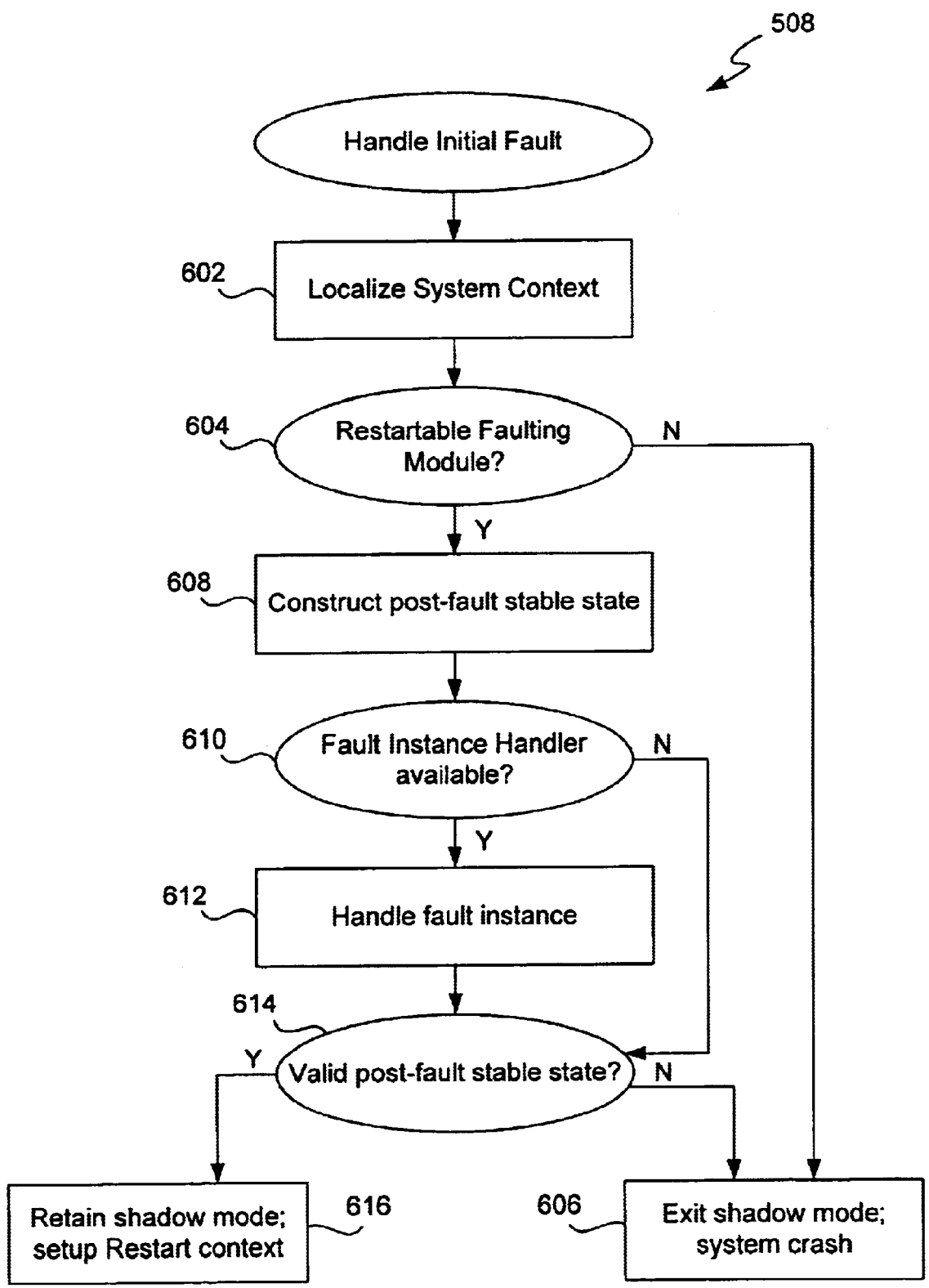
FIG. 6 is a flow diagram describing a process of handling an initial fault in the fault handling virtual machine in accordance with one embodiment of the present invention.

FIG. 6 is a flow diagram describing a process of handling an initial fault in the fault handling virtual machine in accordance with one embodiment of the present invention. It shows in greater detail step 508 of FIG. 5. At step 602 the virtual machine determines or localizes the system context in which the fault occurred. This step is different from step 504 of FIG. 5 in that the virtual machine in step 504 takes a less targeted approach to the problem and simply tries to categorize the fault. In step 602, the problem is pinpointed; for example, specific registers, or memory locations are identified as being corrupted. Specific software modules or hardware interfaces associated with the fault are identified. The problem is narrowed down based on the specific hardware and software being used, i.e., it is platform-specific, which is not done at step 504.

At step 604 the virtual machine determines whether the faulting component or module is restartable. It is possible that a faulting module or action can cause such severe damage to the target system, that the virtual machine cannot help it recover from the crash. The FHVM 202 makes a determination on the recoverability of the system by two means. One is through an a priori expert knowledge developed with the use of training modes. For example, during training it is discovered that the target system cannot tolerate damage to certain critical system data. The validity of such data is checked before making a recovery attempt.

Subsequent determination on the recoverability of the system is made during the construction of post-fault stable states. The algorithms to construct post-fault stable states detect unrecoverable states. If the target system is not recoverable, control goes to step 606 where data on the fault context is provided for analysis by a human being. The information provided is substantially more detailed than what was previously available since the virtual machine attempted to fix the problem using detailed data, and has collected data during this time. All this information is used to make up a detailed collected fault context. At this stage the target system exits shadow mode and the FHVM is uninstalled.

Returning to step 604, if the faulting module is restartable, the virtual machine constructs a post-fault stable state to be used to restart the target system at step 608. A post-fault stable state is the detailed system context that is needed to return from the fault handler with an expectation of recovering from the fault. As described above, a checkpoint is a type of post-fault stable state. The present invention does not use the conventional checkpoint mechanism. This is because a checkpoint mechanism must be tightly coupled with the logic and data structures used to implement the target system i.e., changes to the target system must be reflected correctly in the checkpoint mechanism.

This makes a checkpoint mechanism an integral part of the target system itself. In this sense, a checkpoint mechanism constitutes an overhead on the target system. The cost of the overhead is seen during all phases of the design, implementation, development, deployment, maintenance, and run-time of the target system. The present invention is based on the philosophy that such overhead is not desirable, and often not justified nor necessary. Post-fault stable states of the described embodiment are developed at run-time, after a fault has occurred, and are specific to the particular fault that is being handled, and are developed within the context of the specific fault. A checkpoint mechanism by contrast is static i.e., it does not attempt to adapt to specific faults and is done before any fault has actually occurred.

Figure 8:
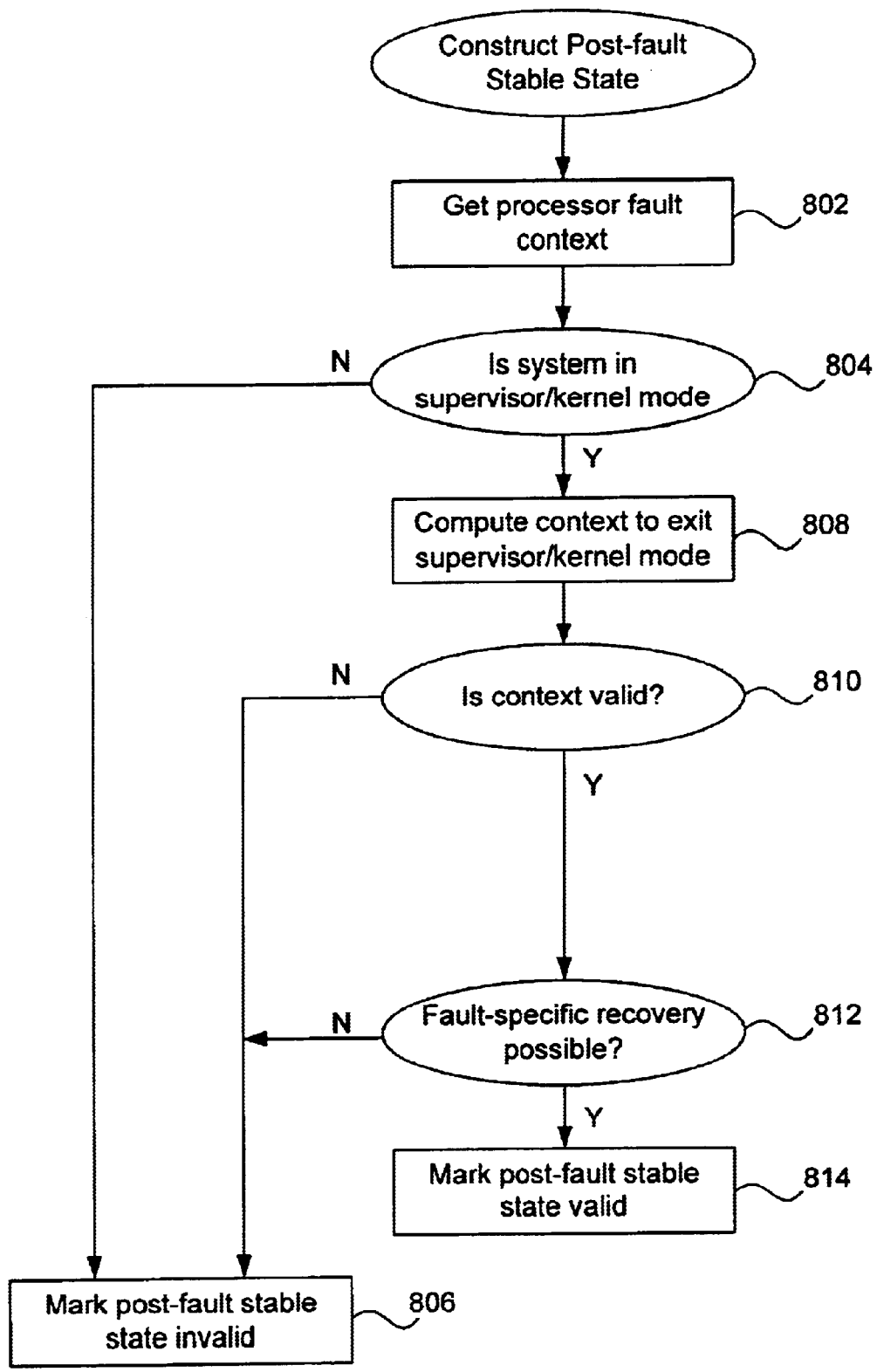
FIG. 8 is a flow diagram of a process of constructing a post-fault stable state for restarting the target system in accordance with one embodiment of the present invention.
Figure 9:
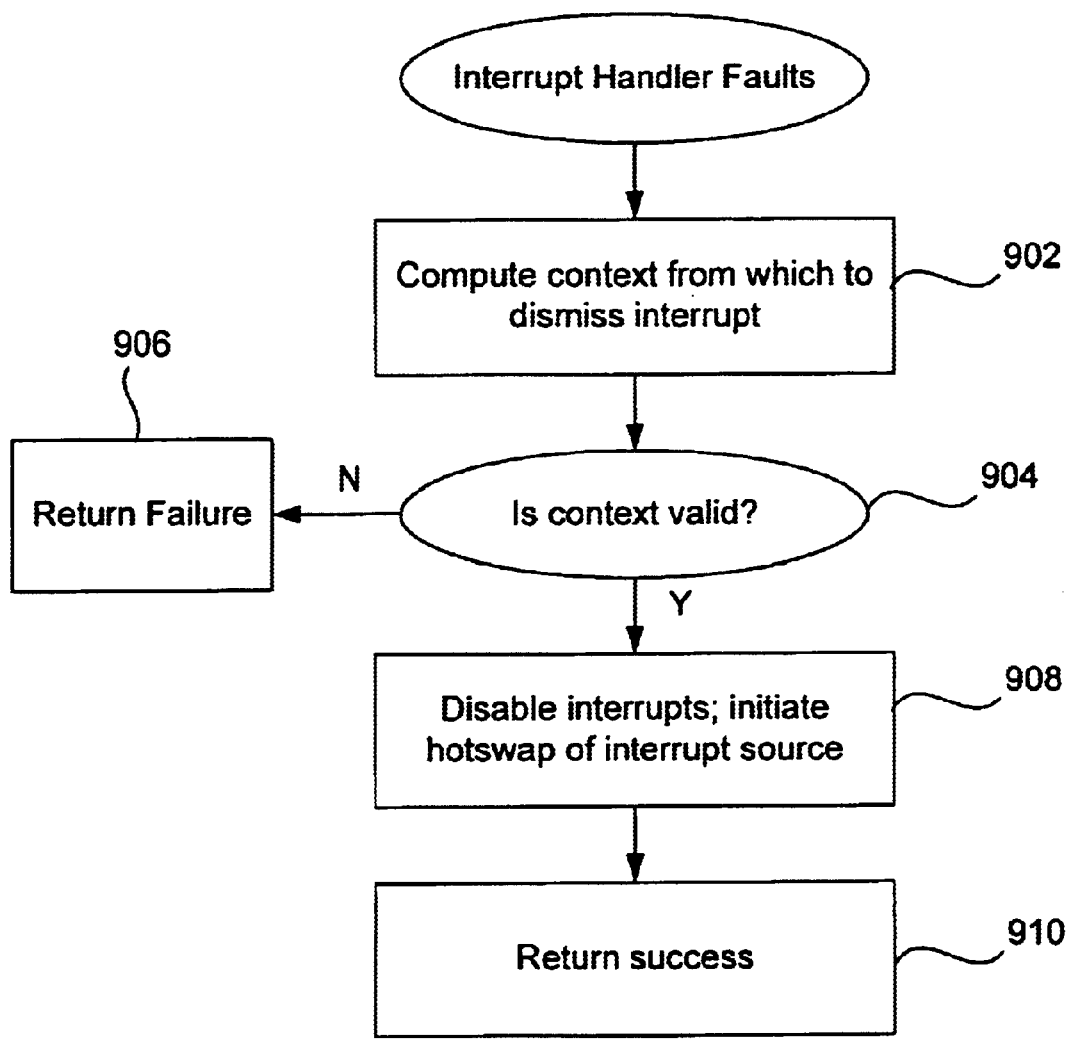
FIG. 9 is a flow diagram of an example of a fault-specific recovery for faults in an interrupt handler in supervisor/kernel mode.

In the described embodiment a particular post-fault stable state is created dynamically. The actions taken to generate the post-fault stable state are tailored to a particular platform or the needs of the party running the target system. An example is shown in FIG. 9 of a recovery action of avoiding a particular interrupt source that caused the fault. The goal is to focus on the specific item or action that caused the fault and avoid it in subsequent processing. The approach is to avoid bringing down the entire target system because of one faulty action which may have been performed by one element in the system. The methods used to dynamically create the post-fault stable state are developed iteratively and over subsequent persistent faults if any. This process is shown in FIG. 8. On each iteration, the post-fault stable state that is developed is a best-effort approximation to the ideal state needed to recover from the fault. At step 604 the virtual machine determines whether there are any methods to handle the particular fault.

At step 610 the FHVM checks whether there are any fault instance handlers available to address the specific fault. These fault handlers can be installed by the entity controlling the target system. The handlers can handle specific problems that are better known to the operators of the target system than to the virtual machine. The handlers can be seen as methods that are tailored to a specific type of problem and are installed by the user, i.e., they are user plug-ins. They allow the virtual machine to be extensible and to fit the needs of the user, who can be far more familiar with the type of problems that may be encountered, and allows for overrides by the user. If there are fault instance handlers, control goes to step 612 where the fault is handled by the fault instance handler.

If there is no fault instance handler available at step 610 or after a fault instance is handled at step 612, control goes to step 614 where the FHVM determines whether the final post-fault stable state is valid. In the described embodiment, the fault instance handler installed by the user has the last word on the content of the post-fault stable state. However, the virtual machine must still make sure the fmal stable state is valid; that is, that the final stable state is in condition to be processed by the virtual machine and target system. If it is, control goes to step 616 where the target system continues normal operation under the belief that the problem was fixed. The system remains in shadow mode and is prepared for subsequent persistent faults. At the same time, the collected fault context is reported to the user. In addition, a restart context is prepared. If the final post-fault stable state is not valid, the target system crashes as described in step 606. It exits shadow mode and the fault handling virtual machine is uninstalled.

Figure 7:
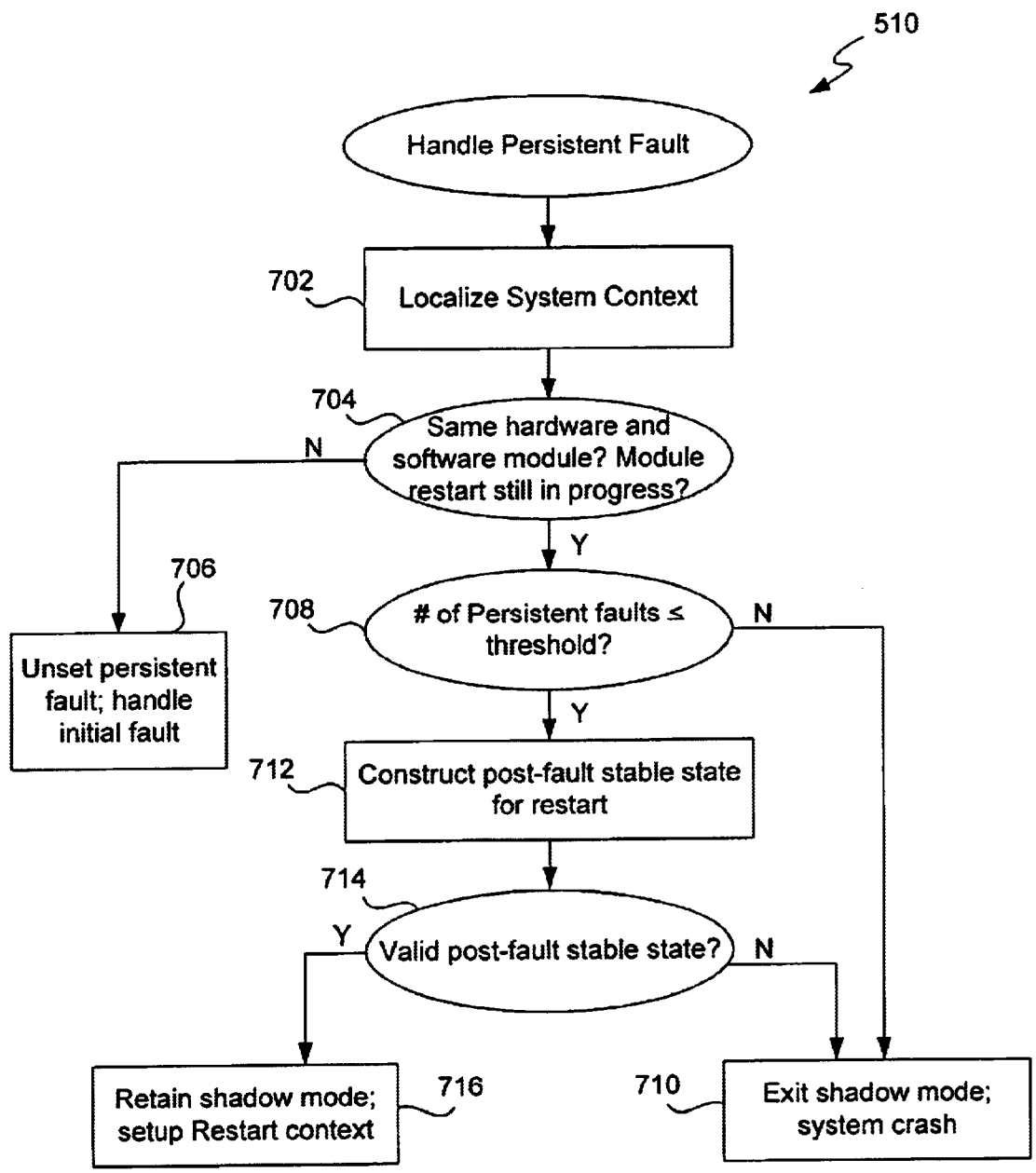
FIG. 7 is a flow diagram showing a process of handling a persistent fault in the fault handling virtual machine in accordance with one embodiment of the present invention.

FIG. 7 is a flow diagram showing a process of handling a persistent fault in accordance with one embodiment of the present invention. It shows in greater detail step 510 of FIG. 5. At step 702 the virtual machine localizes the target system context at the time of the fault to the level of specific hardware and software modules. This step is similar to step 602 where the virtual machine determines or localizes the error that caused the fault and attempts to determine specifically what went wrong. This step is different from step 504 in that step 504 takes a less targeted approach to the problem and simply tried to categorize the fault. In step 702, the problem is pinpointed; for example, specific registers, memory locations, hardware and software modules are identified.

At step 704 the virtual machine determines whether the hardware and software modules and execution threads are the same as the ones causing the initial fault. It also determines whether a restart module set up in step 616 of FIG. 6 is still in progress. If it is, it means that the system is still in the process of recovering from the previous fault. A persistent fault can occur when handling the previous initial or persistent fault. Therefore, the virtual machine needs to determine whether a module restart is still in progress. If the module restart is not in progress or the same modules or threads are not executing, control goes to step 706 where a persistent fault flag or similar indicator is unset. If control reaches step 706, the fault was mistakenly set as a persistent fault when it was not. At step 706, it is treated as an initial fault and the process continues as it would from step 508 in FIG. 5.

If the module restart is still in progress, control goes to step 708 where the FHVM determines whether the number of persistent faults has exceeded a threshold number. This number can be determined empirically for a particular system or set by some other means by the operator of the system. Essentially, this step makes sure that the number of dashed lines 402 in FIG. 4 does not go on indefinitely, for example, past 30 or 50 persistent faults. If the particular persistent fault being processed is the first to exceed the threshold, control goes to step 710 where the target system cannot be recovered by the fault handling virtual machine and crashes. As described above, the FHVM is uninstalled and the target system exits shadow mode.

If the number of persistent faults has not exceeded the threshold, control goes to step 712 where a post-fault stable state for target system restart is constructed. This is similar to step 608 of FIG. 6. A post-fault stable state is a restartable context for a given fault. In the described embodiment a particular post-fault stable state is created dynamically. The recovery actions are tailored to a particular platform or the needs of the party running the target system. Once the virtual machine constructs a post-fault stable state, it checks to ensure that the state is valid at step 714. When handling persistent faults, the user does not have the option of inserting fault instance handlers to handle special faults. In the described embodiment, they are given this opportunity when the initial fault occurs, as shown in steps 610 and 612. At step 714 the FHVM determines whether the final post-fault stable state is valid. The virtual machine must make sure that the final stable state is valid; that is, that the final stable state is in condition to be processed by the virtual machine and target system. If it is, control goes to step 716 where normal operations continue such that the virtual machine believes it has fixed the problem but is still prepared for subsequent persistent faults, as described in step 616. If it is not a valid post-fault stable state at step 714, control goes to step 710 and the system crashes.

FIG. 8 is a flow diagram of a process of constructing a post-fault stable state for restarting the target system in accordance with one embodiment of the present invention. It shows in greater detail steps 712 and 608. A post-fault stable state is constructed using previously provided methods for handling certain types of faults. These stable states are constructed dynamically or in close to real-time when the fault is encountered in the system. It is the post-fault stable states that allow the virtual machine to restart the target system in an intelligent way such that persistent faults can be avoided. They allow the FHVM to do more than simply restart the system using periodic snapshots. As mentioned above, if a post-fault stable state is not valid, the FHVM cannot recover the system and the system crashes.

At step 802 the virtual machine collects specific information on the fault. It can be seen as part of step 504 of FIG. 5 in which the fault context is saved and validated, and the fault instance is classified and categorized. That is, step 802 occurs as part of step 504. These steps are typically performed by most fault handling processes today. However, the virtual machine examines and uses the information gathered in a more detailed manner than was done before. It relies on this information to construct the post-fault stable states and, as a result, mines this data deeper than most checkpoint/recovery systems today. In the described embodiment, the raw data is kept in CPU memory.

At step 804 the virtual machine determines whether the target system was being used in a particular mode, such as supervisor/kernel mode. In other embodiments, it can check for other conditions. In the described embodiment supervisor/kernel faults are targeted for handling by FHVM. This is because such faults are inherently more difficult to handle. As stated above, the present invention handles faults that would otherwise be considered catastrophic by the target system. The methods and techniques described here remain applicable to user application level faults.

Thus, if the target system is not in supervisor/kernel mode, control goes to step 806 where the system crashes. More specifically, the post-fault stable state is marked invalid. If the system was in supervisor/kernel mode at step 804, control goes to step 808 where the post-fault stable state is constructed. The virtual machine begins computing a context that would have resulted if no fault had occurred. This is the context the target system would return to after exiting supervisor/kernel mode. It allows the target system to derive an exit path in which the problem that caused the fault is avoided. The context or post-fault stable state is computed using heuristics of the processor architecture, expert knowledge of the system and current fault state. An illustration is shown in FIG. 9 below.

Steps 810 and 812 are to ensure that the context derived in step 808 is valid and can be seen as sanity checks on what was previously computed. They can be done while the computations in step 808 are being done and, in other embodiments, can include many other checks. At step 810 the virtual machine checks whether the context portraying a scenario in which no fault had occurred is a valid context. If it is not, control goes to step 806 and the target system crashes. Otherwise, control goes to step 812 where it is determined whether a fault-specific recovery is possible. If so, the post-fault stable state, i.e., the context computed in step 808, is marked as valid at step 814 and the process is complete. As mentioned above, steps 810 and 812 are merely two examples of possible sanity checks on the computed contexts. Many others can be included without effecting the overall functioning of the virtual machine.

FIG. 9 is a flow diagram of an example of a fault-specific recovery for faults in an interrupt handler in supervisor/kernel mode. It illustrates one example of step 808 of FIG. 8, namely, a fault in an interrupt handler. At step 902 the virtual machine computes the context from which to dismiss the interrupt as if no fault had occurred, i.e., assume the interrupt fault had never occurred or was cleanly fixed. This is done using heuristics of the processor architecture, expert knowledge of the system, and current fault state. At step 904 it is determined whether the context derived is a valid context. If not, the process fails and the shadow mode is unable to keep the target system from crashing at step 906. If the context is valid, a series of actions are taken shown collectively at step 908. The particular source of the problem is identified and disabled. More specifically, the particular interrupts from the source are disabled and dismissed. A simulated hot swap of the interrupt source is initiated if supported. A hot swap interrupt is generated to initiate removal of the faulting interrupt source. A hot swap interrupt is then generated to re-insert the removed interface. Finally, in step 908, the interrupt context is replaced with a restart context. At this stage the target system can return to normal operation at step 910.

Figure 10:
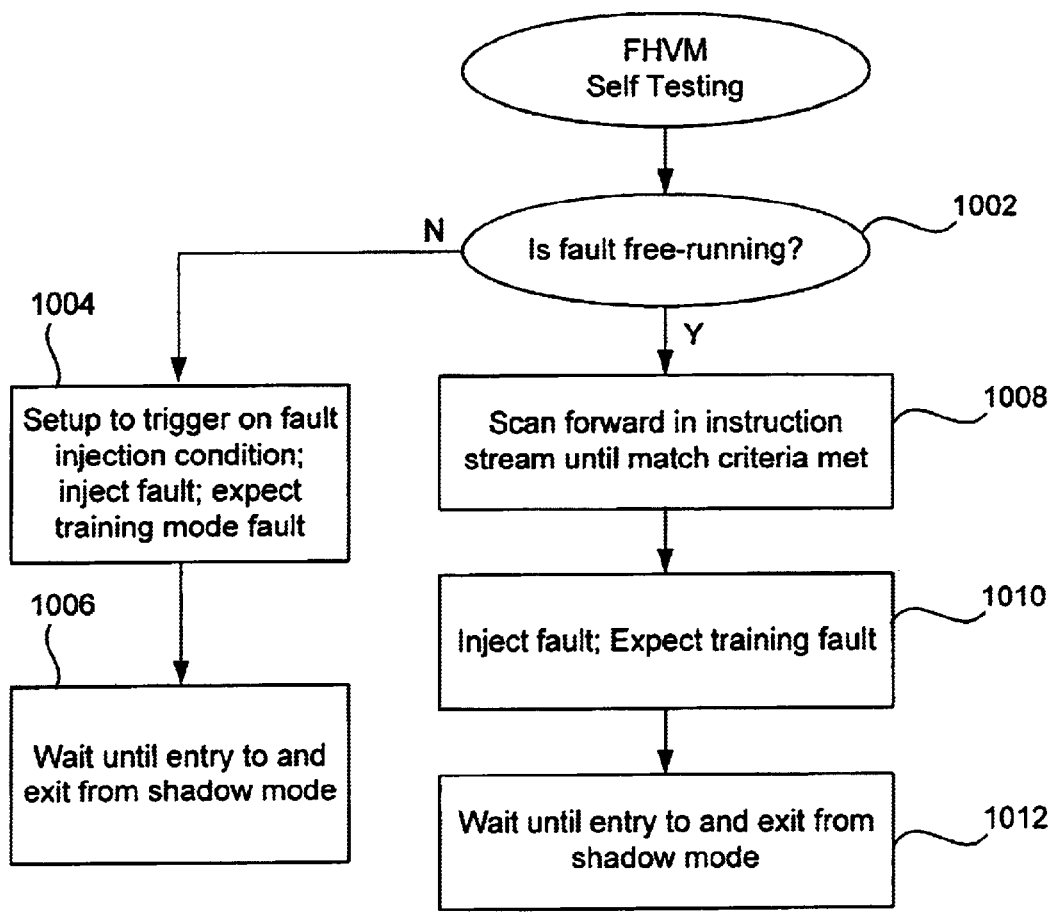
FIG. 10 is a flow diagram of a training or self-testing mode of the virtual machine in accordance with one embodiment of the present invention.

FIG. 10 is a flow diagram of a training or self-testing mode of the virtual machine in accordance with one embodiment of the present invention. As mentioned above, the training mode allows the virtual machine to check its own robustness by identifying its own weaknesses and strengthening them. The target system runs as it normally would, generally in a test or development environment, when a fault is inserted. At step 1002 the FHVM determines whether the fault is a free-running fault. These types of faults are faults that are unidentified; all that is known is that some memory registers are corrupted. This is the most frequent and difficult types of fault to handle since it is generally not known what is in the memory or how it was corrupted. Thus, with free-running faults, it is not really known what problem caused the fault and, consequently, most closely reflects real world fault scenarios.

If the fault is not a free-running fault, a specific problem area can be targeted at step 1004. A trigger is setup for a fault injection condition. When the trigger is set, the specific fault is injected into the target system and a training mode fault is expected. At step 1006 the target system enters shadow mode because of the inserted training fault and then exits shadow mode once the specific problem (known to the tester) causing the fault is fixed.

If the training fault is free-running and, thus, the problem being inserted is not known to the tester, control goes to step 1008. The virtual machine scans forward in the instruction stream until it hits a match criteria. In this step the condition for the fault is being set up and the fault has not yet occurred. At step 1010 the free-running fault is injected into the target system. As mentioned, this is typically done by randomly corrupting memory and therefore not knowing what type of fault will be caused. Control then goes to step 1012 where the target system enters shadow mode and exits when the fault is handled. Control then returns to step 1008 and another free-running fault is created.

As described above, the present invention has the ability to compute a restartable context from a faulting context, to progressively mutate this context to adapt as faults persist, until the system recovers normal operation or the recovery is abandoned. Catastrophic fault handling of the described embodiment is an iterative process. This is a significant departure from the prior art in which a one-shot attempt to report some diagnostic information and crash is made. The iterations occur in real-time with dynamic and progressive refinement of the post-fault stable state on persistent faults. The iterations also occur off-line in progressive refinements to the virtual machine from experience from previous faults it has handled, its ability to self-test, and to report on its own operation.

As described above, the present invention is also a learning system and a teaching system. Its use of training modes yields new algorithms for fault tolerance and new knowledge on diagnosis and fault categorization which feeds back in real-time and in non-real-time via several iterations over the possible solution space. Thus, the invention demonstrates adaptive, evolutionary, and emergent features.

Figure 11:
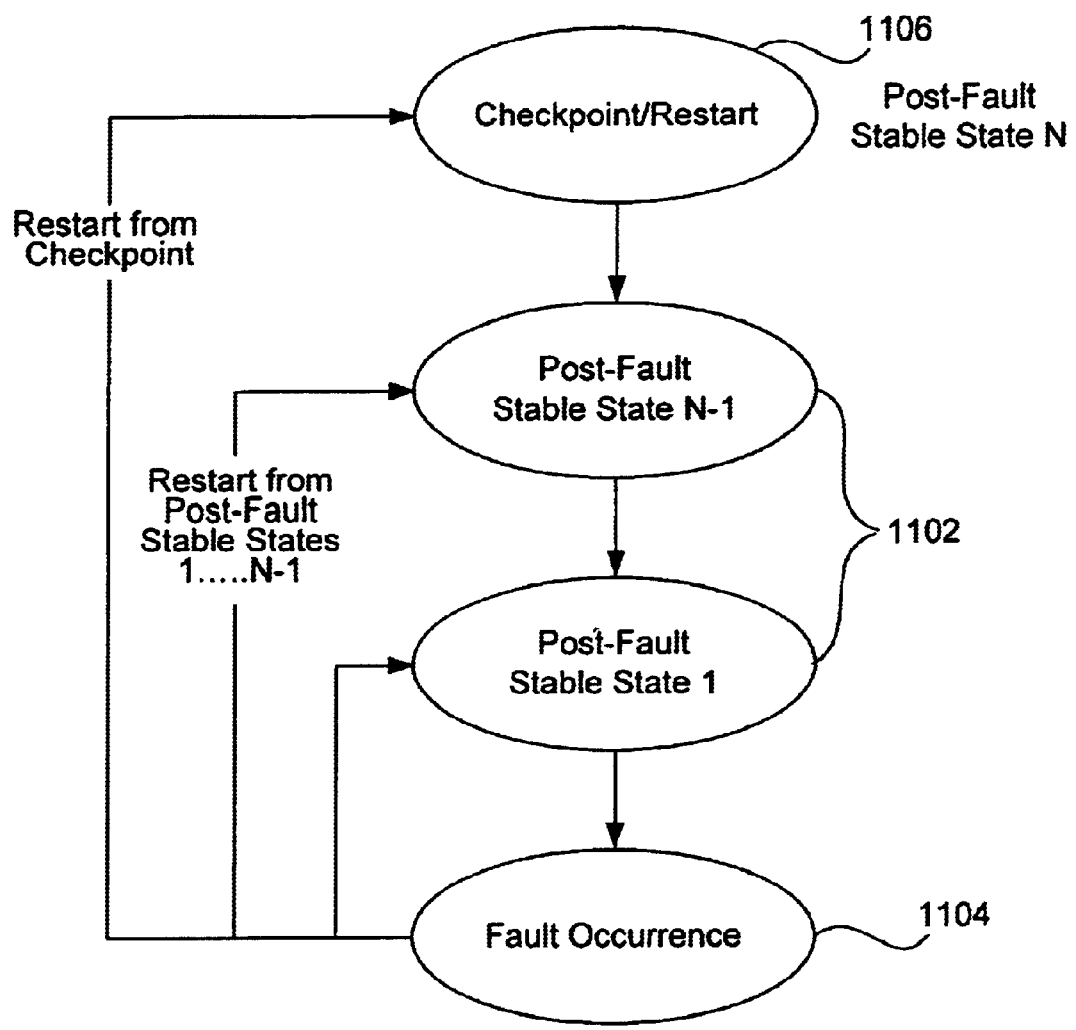
FIG. 11 is an illustration showing how the checkpoint/restart mechanism can be viewed as a special case or a subset of the more general post-fault stable states of the present invention.

FIG. 11 shows how the checkpoint/restart mechanism can be viewed as a special case or a subset of the more general post-fault stable states of the present invention. The difference as noted above is that checkpoints are done a priori with no adaptation for specific fault conditions. Post-fault stable states 1102 are dynamically generated from a fault context itself with small adaptations to the context to circumvent or bypass a fault condition/occurrence 1104. The adaptations progressively increase towards other post-fault stable states until a recovery from the fault is effected or a decision is made that the fault is unrecoverable. In the described embodiment, a conventional explicit checkpoint 1106 is treated identically as post-fault stable states are treated. Thus, checkpoint 1106 is seen to be a special case, non-adaptive subset of the evolutionary post-fault stable state.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of handling a fault in a computer system comprising:

recognizing that an initial fault has occurred by operating in a first sequence in the computer system;

invoking an alternative mode of operation for the computer system upon recognizing the initial fault;

using the alternative mode to track performance of the system after the initial fault thereby gathering post-fault state information for fault diagnosis and system recovery; and preventing a subsequent fault from reoccurring as a result of recovery from the initial fault by using a dynamic state of the computer system to cause the computer system to operate in a second sequence such that the initial fault and the subsequent fault are potentially avoided.

2. A method as recited in claim 1 further comprising installing a fault handling virtual machine residing on the computer system when the initial fault cannot be handled by an existing fault handling process.

3. A method as recited in claim 2 further comprising developing expert knowledge based on observation of a dynamic response of the computer system to fault conditions, wherein the expert knowledge is used by the fault handling virtual machine so that the computer system can recover from a fault.

4. A method as recited in claim 2 further comprising continuing operation of the existing fault handler process on the computer system while the alternative mode is in operation.

5. A method as recited in claim 2 further comprising determining whether the initial fault is a fault created by the fault handling virtual machine in the course of deriving and testing fault recovery algorithms for a plurality of targeted faults.

6. A method as recited in claim 1 wherein using the alternative mode further comprises saving a fault context of the computer system from the initial fault.

7. A method as recited in claim 1 further comprising constructing a post-fault stable state of the computer system using the dynamic state data and a predefined set of methods, thereby allowing the computer system to recover from the initial fault and resume operation.

8. A method as recited in claim 7 wherein constructing a post-fault stable state further comprises utilizing a computer system state at the time of the initial fault and not requiring a previously stored system data check point.

9. A method as recited in 7 further comprising mutating the post-fault stable state by performing one of progressing the post-fault stable state and regressing the post-fault stable state, and observing a response of the computer system to the mutated post-fault stable state.

10. A method as recited in claim 9 further comprising iteratively modifying the mutated post-fault stable state to achieve desired fault recovery characteristics for the computer system.

11. A method as recited in claim 1 wherein, when the computer system is operating normally, the alternative mode of operation is not invoked, thereby not utilizing computer system resources.

12. A method as recited in claim 1 further comprising collecting the system state data on the computer system in a manner that does not interfere with normal operation of the computer system.

13. A method as recited in claim 1 further comprising using the alternative mode to supervise normal operation of the computer system, wherein normal operation includes user mode and supervisor mode.

14. A method as recited in claim 1 further comprising entering the alternative mode without effecting processes executing in the system.

15. A method as recited in claim 1 further comprising handling one or more persistent faults in alternative mode after detecting the initial fault.

16. A method as recited in claim 1 wherein the initial fault would cause the computer to crash if the alternative mode of operation had not been invoked.

17. A method as recited in claim 1 further comprising utilizing a fault instance handler to fix predetermined faults.

18. A method as recited in claim 1 further comprising creating a detailed fault context containing information that would normally not be gathered by an existing fault handling mechanism.

19. A method as recited in claim 1 further comprising developing a training mode for destructive and non-destructive fault simulation to test the computer system.

20. A fault handling virtual machine installed on a computer system upon detection of an unrecoverable fault, the fault handling virtual machine comprising:

a post fault stable state constructor for constructing a normal operating state for the computer system after a fault occurs;

a fault data collector for collecting specific information on the state of the computer system at the time of the fault; and a fault data examination component for examining the specific information on the state of the computer system after a fault occurs.

21. A fault handling virtual machine as recited in claim 20 further including a persistent fault handler.

22. A fault handling virtual machine as recited in claim 20 that extends the capabilities of the computer system to fault diagnosis and recovery by applying expert knowledge of the computer system.

23. A fault handling virtual machine as recited in claim 20 that emulates operation of the computer system.

24. A fault handling virtual machine as recited in claim 20 further including a fault type component for determining whether the fault is a training mode fault.

25. A fault handling virtual machine as recited in claim 20 further including a fault severity measuring component for determining the severity of a fault by looking at expert knowledge of the computer system and a current fault state.

26. A fault handling virtual machine as recited in claim 20 wherein the post-fault stable state constructor performs iteratively.

27. A fault handling virtual machine as recited in claim 20 further including a context check component for checking the normal state of the computer.

28. A fault handling virtual machine as recited in claim 20 further including a fault context validator for saving and validating state information at a specific time.

29. A fault handling component in a computer system for handling a severe fault comprising:

a means for recognizing that an initial fault has occurred by operating in a first sequence in the computer system;

a means for invoking an alternative mode of operation for the computer system upon recognizing the initial fault;

a means for tracking performance of the system after the initial fault using the alternative mode thereby gathering post-fault state information for fault diagnosis and system recovery; and a means for preventing a subsequent fault from reoccurring as a result of recovery from the initial fault by using a dynamic state of the computer system to cause the computer system to operate in a second sequence such that the initial fault and the subsequent fault are potentially avoided.

30. A computer-readable medium containing programmed instructions arranged to handle a fault in a computer system, the computer-readable medium including programmed instructions for:

recognizing that an initial fault has occurred by operating in a first sequence in the computer system;

invoking an alternative mode of operation for the computer system upon recognizing the initial fault;

using the alternative mode to track performance of the system after the initial fault thereby gathering post-fault state information for fault diagnosis and system recovery; and preventing a subsequent fault from reoccurring as a result of recovery from the initial fault by using a dynamic state of the computer system to cause the computer system to operate in a second sequence such that the initial fault and the subsequent fault are potentially avoided.

31. A component in a computer system for handling a fault in a computer system, the component comprising:

a memory; and a processor coupled to the memory, wherein the processor is programmed to perform the steps of:

recognizing that an initial fault has occurred by operating in a first sequence in the computer system;

invoking an alternative mode of operation for the computer system upon recognizing the initial fault;

using the alternative mode to track performance of the system after the initial fault thereby gathering post-fault state information for fault diagnosis and system recovery; and preventing a subsequent fault from reoccurring as a result of recovery from the initial fault by using a dynamic state of the computer system to cause the computer system to operate in a second sequence such that the initial fault and the subsequent fault are potentially avoided.

* * * * *